United States Patent [19]
Shinya et al.

[11] Patent Number: 6,040,556
[45] Date of Patent: Mar. 21, 2000

[54] ENGINE DRIVEN ARC WELDER

[75] Inventors: Keigo Shinya; Wen Long Kou, both of Koka-gun; Osamu Suzuki; Shunichi Tetsui, both of Kawagoe, all of Japan

[73] Assignee: Denyo Kabushiki Kaisha, Tokyo-to, Japan

[21] Appl. No.: 09/162,785

[22] Filed: Sep. 30, 1998

[30] Foreign Application Priority Data

Oct. 1, 1997 [JP] Japan .................................. 9-268950

[51] Int. Cl.$^7$ ................................................ B23K 9/095
[52] U.S. Cl. ..................................... 219/133; 219/130.33
[58] Field of Search .............................. 219/133, 130.21, 219/130.31, 130.32, 130.33, 134

[56] References Cited

U.S. PATENT DOCUMENTS

| | | | |
|---|---|---|---|
| 5,250,786 | 10/1993 | Kikuchi et al. | 219/130.33 |
| 5,637,246 | 6/1997 | Ikegami et al. | 219/133 |
| 5,670,070 | 9/1997 | Clark et al. | 219/133 |
| 5,734,147 | 3/1998 | Bunker et al. | 219/133 |
| 5,814,788 | 9/1998 | Everhart et al. | 219/133 |

FOREIGN PATENT DOCUMENTS 0648569  4/1995  European Pat. Off. .

*Primary Examiner*—Clifford C. Shaw
*Attorney, Agent, or Firm*—Jacobson, Price Holman & Stern PLLC.

[57] ABSTRACT

An engine driven arc welder including a welding generator driven by an engine; output circuits for controlling the output of the welding generator in accordance with a control signal and for delivering the output to welding output terminals; a current detector for detecting the current flowing in the welding output terminals; an error detector for comparing the output of the current detector with a reference signal to detect error; a control signal producing circuit for producing the control signal in accordance with output of the error detector and for delivering it to the output circuit; and a voltage detector R10, VR10 for detecting voltage to be delivered to the welding output terminals, wherein the arc welder has a welding output characteristic having a constant current control arc characteristic in accordance with the reference signal and which exhibits a drooping characteristic in the vicinity of the arcing voltage and which is capable of increasing the current when the arc voltage is lowered. The engine driven arc welder includes an adjustment circuit VR10, R10, VR20, R20 for determining the magnitude of the reference signal to be delivered to the error detector in accordance with the output of the voltage detector to change the reference signal, thereby allowing the inter-characteristic transfer point between the constant current control arc characteristic and the drooping characteristic to be adjustable.

1 Claim, 4 Drawing Sheets

ENGINE DRIVEN ARC WELDER

BACKGROUND OF THE INVENTION

This invention relates to an engine driven arc welder, especially to an engine-driven arc welder which may be adjusted in accordance with the characteristics the type of sheathed electrode or the welding position.

Engine driven arc welders weld by creating an arc between the electrode and the material being welded. The power for this comes from a generator driven by an engine, and this power is controlled by a controlling signal and controlling elements.

In arc welding, short-circuits often occur when molten metal or the electrode comes into direct contact with the material being welded. When the welder (operator) goes to re-start the arc after such a short-circuit, if the welder (apparatus) is such that it produces a large current the arc will be easy to re-start, though much sputtering will be produced. On the other hand, if the welder of the type that does not produce a large current in order to ensure better welding quality, it will be difficult to re-start the arc after shorting. This results in the arc cut-off or the electrode sticking the base material. Thus, the welding work may be interrupted if the welder is not so skillful. These kinds of problems are likely to occur particularly when work is carried out in areas where the current is low or when the arc is short.

In the conventional welders in which large current flows during a short-circuit, the arcing can be interrupted the electrode may stick to the base metal and electrode and much spattering may occur, depending on the type of electrode used and the welding position. This is because the characteristic voltage during a transition from a constant current characteristic to an increased current characteristic and the increased fixed current characteristic value for a short circuit are fixed in advance to suit the type of electrodes used in Japan. Even in the case a skilled welder carries out the welding, the appearance of the beads will be less than satisfactory and fine adjustments to the manipulation of the electrode are difficult to carry out, if much sputtering occurs. In addition, when welding is carried out using high cellulose type electrodes, as is often used in overseas countries, it becomes even more difficult to deal with such problems.

SUMMARY OF THE INVENTION

It is an object of this invention to provide an engine-driven arc welder for providing a suitable arc current and short-circuit current required for droplet transfer in accordance with the type of sheathed electrode used and the welding position.

To achieve the above-mentioned object, in accordance with this invention, there is provided an engine driven arc welder comprising: a welding generator driven by engine; an output circuit which controls the output of the welding generator in accordance with a control signal and which delivers this to the welding output terminals; a current detector for detecting the current in the welding output terminals; an error detector which compares the output of this current detector with a reference signal to detect error; a control signal producing circuit which produces the control signal in accordance with output of the error detector and which supplies this signal to the output circuit; and a voltage detector which detects the voltage applied to the welding output terminals. The arc welder has constant current control arc characteristic based on the reference signal and exhibiting a drooping characteristic in the vicinity of arc voltage and is capable of increasing current at the time when the arc voltage is lowered. The arc welder also has an adjustment circuit which determines the magnitude of the reference signal to be delivered to the error detector in accordance with output of the voltage detector. By varying the reference signal the inter-characteristic transfer point between the constant current control arc characteristic and the drooping characteristic can be varied.

BRIEF DESCRIPTION OF THE DRAWINGS

FIG. 2b is a partial circuit diagram showing a modified portion of FIG. 2a.

DESCRIPTION OF THE PREFERRED EMBODIMENTS

Figure 1:
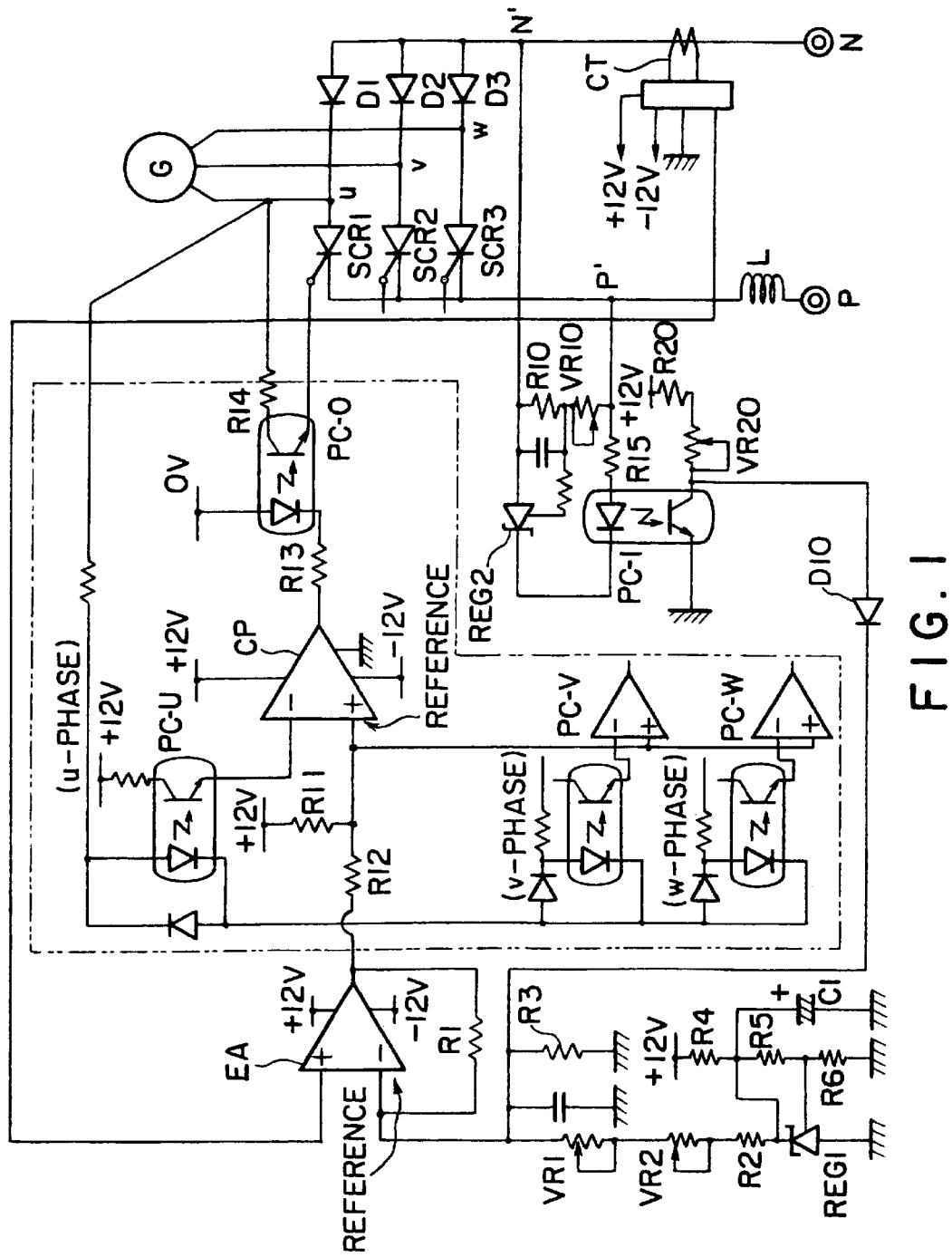
FIG. 1 is a circuit diagram showing an embodiment of this invention.

FIG. 1 is a circuit diagram showing the configuration of an embodiment of this invention. In FIG. 1, the main circuit, i.e., output circuit for welding current is shown at the right side in the figure, and its control circuit is shown at the left side thereof.

Further, in the main circuit, the output of the welding generator G is rectified by a mixed bridge circuit of thyristors SCR1–SCR3 and diodes D1–D3 to supply power to the portion between welding electrode and the base material (not shown) from welding output terminals P, N through a reactor L to generate an arc.

Further, the control circuit includes a thyristor drive circuit connected to gates of thyristors SCR in the main circuit (encompassed by double dotted lines), and an error detection circuit. The error detector circuit delivers error signals detected in accordance with the voltage detection signals and the current detection signals in the main circuit to the thyristor drive circuit as a reference signal to be compared with respective phase voltage signals, which are indicated at the periphery of the portion encompassed by double dotted lines indicating the above-mentioned thyristor drive circuit.

The error detection circuit includes an error amplifier EA, and has a positive input terminal supplied with welding current detected by d.c. current transformer CT as voltage signal, and a negative input terminal supplied with respective voltage signals from variable resistors VR1, VR2, a variable three-terminal regulator REG1, a reference voltage forming circuit including a resistor R3 for earth use, and a reference voltage adjustment circuit connected through a diode D10 to this reference voltage forming circuit and operative to adjust its reference voltage. In addition, the minus terminal of the error amplifier EA is fed back to the output terminal through a resistor R1.

The reference voltage forming circuit is composed of: the variable three-terminal regulator REG 1; the variable resistor VR1 for adjusting the arc current; and the variable resistor VR2, resistors R3 to R6, and electrolytic capacitor C1 which adjust the variations of each product. This means that, both ends of anode/cathode of the variable three-terminal regulator REG1 and the electrolytic capacitor C1 are connected in parallel with resistors R5 and R6 in the series circuit of resistors R4, R5 and R6 connected between a circuit power supply +12V and earth (ground), and the control terminal of the variable three-terminal regulator REG1 is connected to the junction of resistors R5 and R6. In addition, the cathode of the variable three-terminal regulator REG1 is earthed (grounded) through resistor R2, the variable resistors VR2, VR1 and the register R3, and the junction of the variable resistor VR1 and the resistor R3 is connected to the minus terminal of the error amplifier EA.

Thus, shared voltage of the resistor R6 in the series circuit of the resistors R4 to R6 is applied at all times to the control terminal of the variable three-terminal regulator REG1. Thus, a constant voltage corresponding thereto is produced across both terminals of anode/cathode thereof. This constant voltage is earthed (grounded) through the resistor R2, the variable resistors VR2, VR1 and the resistor R3, and is given as reference signal with respect to the minus terminal of the error amplifier EA from junction of the variable resistor VR1 and the resistor R3.

The variable three-terminal regulator REG1 produces, across anode and cathode, a voltage approximately proportional to the voltage applied to the control terminal, and can be utilized as a constant voltage element for a control system.

At the same time, the reference voltage adjustment circuit produces voltage output by a photo-coupler PC-1 (which is supplied with power by the voltage response of a voltage dividing circuit (which divides through a resistor R10)) and a variable resistor VR10 and a variable three-terminal regulator REG2, an element similar to the above REG1 which delivers the output voltage to the minus terminal of the error amplifier EA through the diode D10. This means that the divided voltage, received from the voltage dividing circuit that includes the resistor R10 and the variable resistor VR10 which are connected to junctions P', N' of the reference voltage adjustment circuit and output line of the mixed bridge circuit is delivered to the control terminal of the variable three-terminal regulator REG2 through a noise-eliminating CR filter. Thus when a predetermined voltage or more is applied across both terminals of the anode and the cathode of this variable three-terminal regulator REG2, current is caused to flow in the variable three-terminal regulator REG2 to light the light emitting diode of the photo-coupler PC-1 thereby allowing the photo-transistor to be conductive. In this example, the protective circuit for high voltage of the variable three-terminal regulator REG2 is omitted.

Thus, the degree of conduction of the photo-transistor in the photo-coupler PC-1, in which a variable resistor VR20 is connected in series through a protective resistor R20, is controlled in accordance with the quantity of light emitted from the light emitting diode in this photo-coupler. The voltage that the photo-transistor shares by the variable resistor VR20 and the resistors R20 and R3 is delivered to the minus terminal of the error amplifier EA through the diode D10. The minus terminal of the error amplifier EA is earthed by a capacitor for noise elimination.

Further, the plus terminal of the error amplifier EA is supplied with current detection signal from the D.C. current transformer CT which has a built in operational amplifier (not shown), and the current detection signal is compared with reference signal given to the minus terminal. The margin of error obtained between the two signals is passed through a resistor R12 to the plus terminal for inputting the reference signal at comparator CP from the output terminal of the error amplifier EA. Resistor R12 is connected to one end of resistor R11, while the other end of R11 is connected to the circuit power supply.

One terminal of the comparator CP, which receives the input signal to be compared with this reference signal, is supplied with signal corresponding to u-phase voltage of the welding generator G. This means that, the u-phase voltage is delivered to the light emitting diode of the photo-coupler PC-U, and the voltage signal that the photo-transistor forms in accordance with quantity of light emitted is delivered to the minus terminal of the comparator CP. Thus, the comparator CP delivers a corresponding output to the light emitting diode in the photo-coupler PC-O through resistor R13. Further, an energization control signal is delivered from photo-transistor in the photo-coupler PC-O to the gate of the thyristor SCR1 through resistor R14. This means that the thyristor SCR1 is to undergo energization control in accordance with outputs of the error detecting circuit and the thyristor drive circuit which corresponds to output voltage and output current of the mixed bridge circuit.

In this case, although illustration is partially omitted in FIG. 1, similar circuit configurations are also employed for the v-phase and w-phase.

Figure 2A:
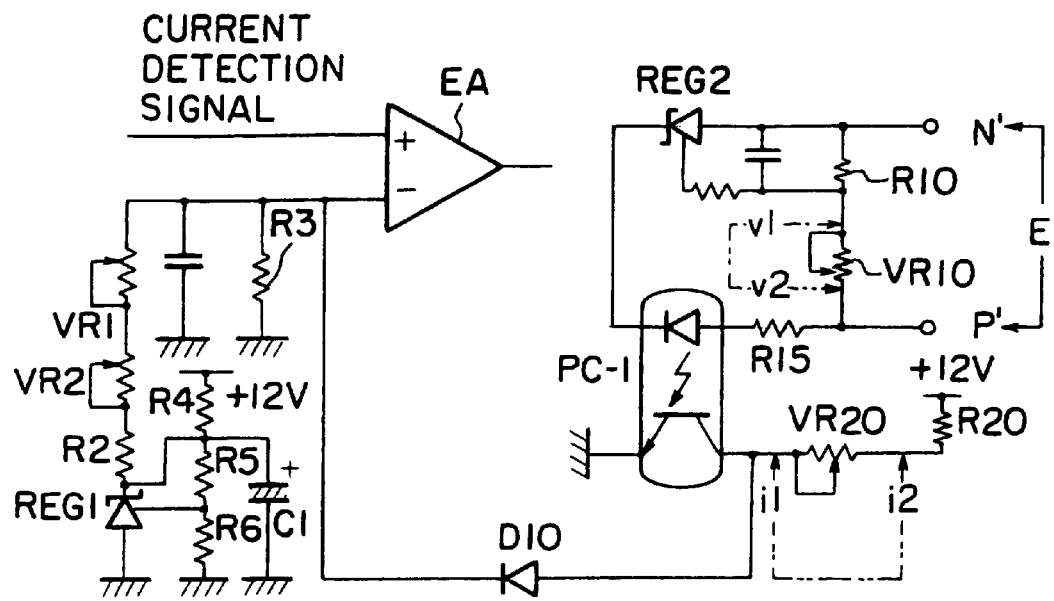
FIG. 2a is a partial circuit diagram showing the circuit configuration of the portion for adjusting the welder output characteristics in the circuit showing FIG. 1.

FIG. 2a is a simplified circuit diagram explaining the operation of the error amplifier EA which corresponds to the output voltage detection signal of the mixed bridge circuit in FIG. 1. Junctions P' and N' in the mixed bridge circuit are supplied with welding voltage E (no load voltage V1 to short-circuit voltage VS) applied to welding output terminals P, N.

Voltage obtained by dividing this welding voltage E by voltage dividing ratio between resistor R10 and variable resistor VR10 is delivered to the control terminal of the variable three-terminal regulator REG2. As a result, the voltage corresponding thereto is produced across both terminals of the anode and the cathode terminals of the variable three-terminal regulator REG2. Thus, energization of both light emitting diode in the photo-coupler PC-I and resistor R15 is carried out in the state where voltage obtained by subtracting the variable three-terminal regulator REG2 portion of the voltage across junctions P' and N' is applied thereto. Further, as the result of the fact that energization is carried out through the protective resistor R15, light corresponding to voltage across junctions P' and N' is produced from the light emitting diode, and is delivered to the photo-transistor in the photo-coupler PC-I.

In response to this, the voltage obtained by dividing the voltage of the circuit power supply (+12V) by the photo-transistor, the resistor R20 and the variable resistor VR20, is produced at the photo-transistor of the photo-coupler PC-I. The voltage thus produced is delivered to the minus terminal of the error amplifier EA through diode D10.

Figure 2B:
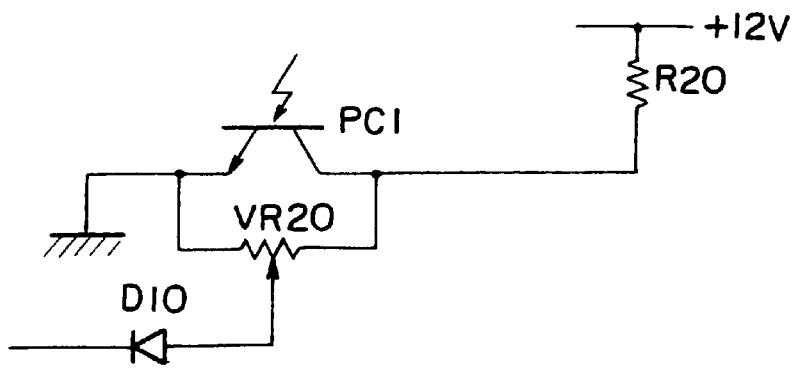

In this case, a variable resistor VR20 can be directly inserted between the register R20 and the photo-transistor as shown in FIG. 2a, or it can be used to bridge over the emitter and the collector of the photo-transistor as shown in FIG. 2b.

Figure 3A:
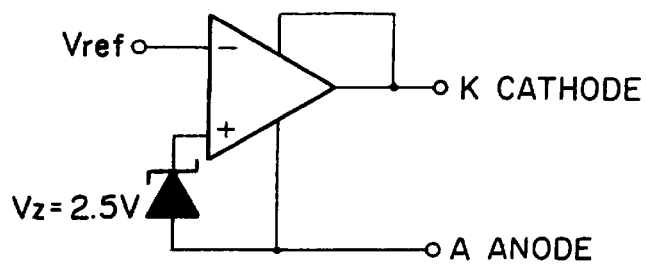
FIG. 3a is an equivalent circuit diagram of a variable three-terminal regulator.

FIG. 3a shows the equivalent circuit of the variable three-terminal regulator shown in FIGS. 1 and 2a. As apparent from this equivalent circuit, the configuration is such that, when the control signal voltage Vref applied to the control terminal (−) exceeds the constant voltage Vz applied to the reference signal terminal (+), the anode-cathode voltage corresponds to the control signal voltage Vref.

Figure 3B:
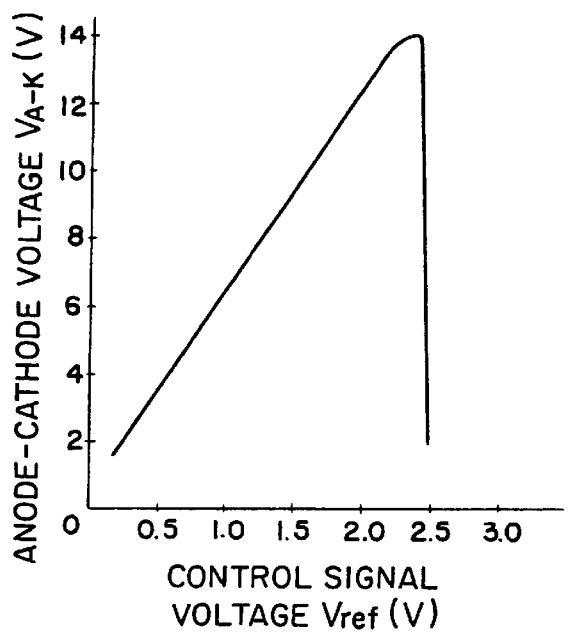
FIG. 3b is control signal voltage—anode/cathode voltage characteristic diagram thereof.

FIG. 3b indicates measured control characteristics, wherein the anode-cathode voltage VA-K is approximately proportional to control signal voltage Vref. The X-axis in this characteristic diagram indicates control signal voltage Vref which is delivered to the control terminal while the Y-axis indicates anode-cathode voltage VA-K.

As for the variable three-terminal regulator REG1, The constant voltage characteristic is obtained by using the region where conductivity is achieved the control signal voltage Vref becomes close to 2.5V in FIG. 3b.

As for the variable three-terminal regulator REG2, the control signal voltage Vref to be delivered to the control terminal is the voltage obtained by dividing the voltage across junctions P' and N' by the voltage divisional ratio by resistor R10 and variable resistor VR10. Voltage VA-K corresponding to this control signal voltage Vref is produced across the anode and the cathode of the variable three-terminal regulator REG2. This voltage VA-K serves as a shared voltage of the variable three-terminal regulator REG2.

Figure 3C:
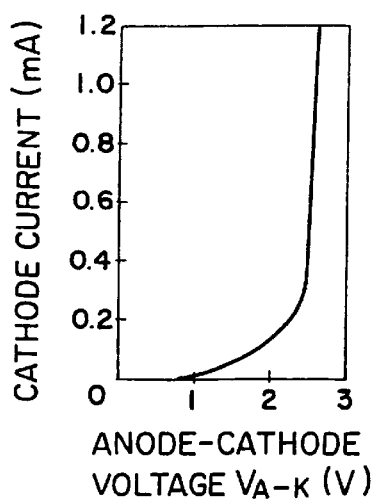
FIG. 3c is a falling characteristic diagram from ON to OFF thereof.

FIG. 3c shows the rising characteristic from OFF to ON (falling characteristic from ON to OFF) of the variable three-terminal regulator. This means that the variable three-terminal regulator is almost completely conductive when the anode-cathod voltage VA-K becomes roughly equal to 2.5 V and is almost completely non-conductive when it becomes roughly equal to 1.0 V. This is utilized for output characteristic which will be described later.

Figure 4:
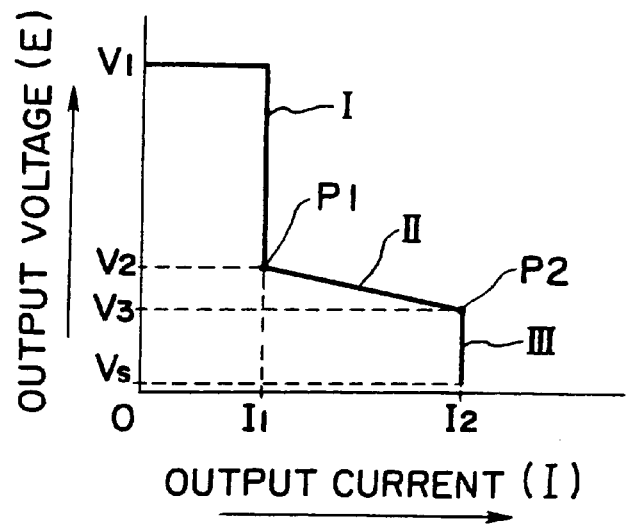
FIG. 4 is a characteristic diagram showing adjustments of output voltage—output current characteristics in the partial circuit of FIG. 2.

FIG. 4 shows the characteristics of changes and details of adjustment in the output voltage and output current of the welder due to resistance value changes in the circuit comprises variable resistor VR10 provided at the light emitting diode side of the photo-coupler PC-I and variable resistor VR20 provided at the photo-transistor side.

The welder of this invention has output characteristic in the constant current characteristics I, III and the drooping characteristic II are combined. In the constant current characteristic, slight drooping characteristic (constant voltage characteristic is also included in the drooping characteristic) is included.

The first constant current characteristic I is obtained as the result of the fact that the minus terminal of the error amplifier EA is kept at constant voltage, as set by variable resistor VR1. Since the photo-transistor in the photo-coupler PC-I is caused to be conductive, namely, is brought into an ON state to be earthed when the arc voltage is large, i.e., V1 to V2, voltage is blocked by the diode D10 and has no effect on the minus terminal of the error amplifier EA. The above-mentioned constant voltage is basically determined by set value of the variable resistor VR1.

The drooping characteristic II is obtained by changes when the photo-transistor in the photo-coupler PC-I is transferred ON to OFF, i.e., changes in the degree of conduction when the photo-transistor in the photo-coupler changes from a conductive state to a non-conductive state based on the falling characteristics from ON to OFF for the variable three-terminal regulator as shown in FIG. 3c. This change is produced when the arc voltage is lowered to some degree, i.e., changes from V2 to V3. The photo-transistor shifts from ON to OFF when the arc voltage is lowered, i.e., falls within the range from V2 to V3. Thus, when collector voltage changes, the voltage corresponding to this change is applied as a reference signal of the minus terminal of the error amplifier EA.

The second constant current characteristic III is obtained by variable resistor VR20 and divided voltage of mainly resistor R3 and variable resistor VR20, which are applied to the minus terminal of the error amplifier EA when the photo-transistor of the photo-coupler PC-I is turned OFF. This is produced when the arc voltage is lowered from V3 to VS.

As stated above, during the time the photo-transistor in the photo-coupler PC-I is turned ON, the reference signal of the error amplifier EA corresponds to the signal based on the first constant current arc characteristic set by the variable resistors VR1, VR2 and the variable three-terminal regulator REG1. In such a case, as the photo-transistor in the photo-coupler PC-I shifts from an ON state to an OFF state, the first constant current characteristic I, the drooping characteristic II and the second constant current characteristic III are combined in accordance with that change. Thus, the characteristic according to this invention is obtained.

Transfer point P1 from the first constant current characteristic I to the drooping characteristic II corresponds to the point where the anode-cathode voltage VA-K in FIG. 3c is about 2.5 V, and transfer point P2 from the drooping characteristic II to the second constant current characteristic III corresponds to the point where the anode-cathode voltage VA-K in FIG. 3c is about 1.0 V.

Figure 5A:
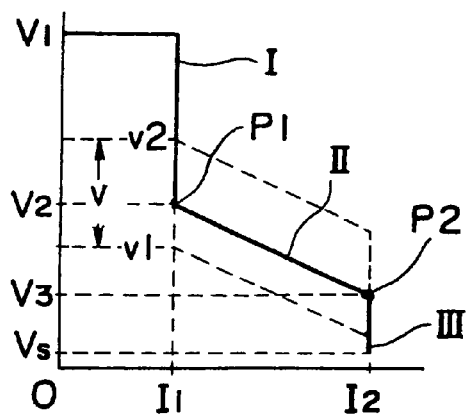
FIGS. 5a and 5b are characteristic diagrams showing adjustment to the output voltage—output current characteristic shown in FIG. 4.
Figure 5B:
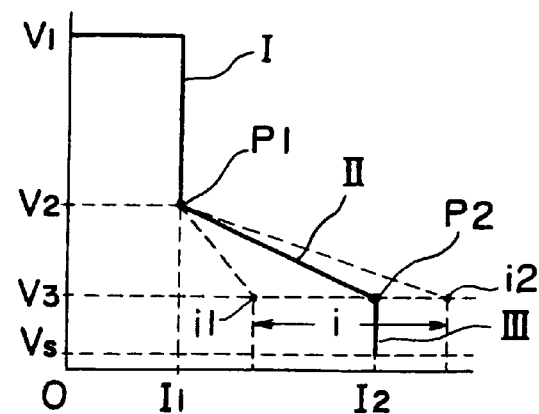

FIGS. 5a and 5b show adjustment details of the output voltage-output current characteristic shown in FIG. 4, wherein FIG. 5a shows transition of transfer point P1 when inter-characteristic transfer point P1 between the first constant current characteristic portion I and the drooping characteristic portion II is changed, and FIG. 5b shows transition of transfer point P2 when inter-characteristic transfer point P2 between the drooping characteristic portion II and the second constant current characteristic portion III is changed.

The first constant current characteristic portion I is constant or almost constant by current I1 set by variable resistor VR1, and the second constant current characteristic portion III is constant or almost constant at current I2 set by variable resistor VR20. The drooping characteristic portion II is the characteristic portion obtained by connecting the inter-characteristic transfer point P1 of the first constant current characteristic portion I and inter-characteristic transfer point P2 of the second constant current characteristic portion III. The transfer point P1 undergoes parallel displacement as indicated by the portion from v1 to v2 of FIG. 5a by adjustment of variable resistor VR10, and the transfer point P2 undergoes parallel displacement as indicated by the portion from ι1 to ι2 of FIG. 5b by adjustment of the variable resistor VR20.

As the result of such adjustment, the first constant current characteristic portion I is constant or almost constant at current I1 by adjustment of the variable resistor VR1. The transfer points P1 and P2 are caused to respectively undergo parallel displacement at the portion from v1 to v2 and the portion from ι1 to ι2 by adjustments of the variable resistors VR10 and VR20.

Accordingly, when the first constant current characteristic portion I is set to conform with arc current I1 by variable resistor VR1, one or both of the variable resistors VR10 and VR20 is or are adjusted, thereby making it possible to arbitrarily select inter-characteristic transfer voltage between the first constant current characteristic and the drooping characteristic to be combined therewith and the inter-characteristic transfer current between the drooping characteristic and the second constant current characteristic.

Since the drooping characteristic can be arbitrarily combined with two constant current characteristics of the first constant current characteristic portion I and the second constant current characteristic portion III as stated above, in the case where welding is carried out in the state where arc length is shortened for high cellulose type electrode as commonly used in countries outside Japan, setting of inter-characteristic transfer point P1 to reasonable drooping characteristic and inter-characteristic transfer point P2 to reasonable short-circuit current can be arbitrarily carried out. Thus, satisfactory welding can be carried out with ease. As a result, cutting of arc and/or sticking or securing of the welding electrode and the base material can be prevented, thus making it possible to minimize spattering. For this reason, satisfactory welding can be carried out with good workability.

While this invention relates to welder with phase control of the thyristor as a control element for output control in the above-mentioned embodiment, this invention can be also applied to the welding unit with circuit configured to rectify the output of the welding generator and which contain transistor or IGBT chopper controls that change this rectified output.

The control box for the variable resistors VR1, VR10 and VR20 used for various adjustments in the above-mentioned embodiment, can be provided externally or internally.

In accordance with this invention, as described above, it is possible to provide output characteristics suitable for a wide variety of sheathed welding electrodes. This is because the output characteristic of the arc welder is obtained by connecting the drooping characteristic determined in advance for a certain constant current characteristic by an arbitrary voltage and combining them with each other. Further, one of the two constant current characteristics is made to correspond to the arc current and the other is made to correspond to short-circuit current, and the arbitrary points of both characteristics are connected with the drooping characteristic, thereby making it possible to provide a welder suitable for a wide variety of sheathed welding electrodes.

What is claimed is:

1. An engine driven arc welder comprising:

a welding generator driven by an engine;

an output circuit for controlling output of the welding generator in accordance with a control signal to deliver the output to the welding output terminals;

a current detector for detecting current flowing in the welding output terminals;

an error detector for comparing the output of the current detector with a reference signal to detect error therebetween;

a control signal producing circuit which produces a control signal in accordance with the output of the error detector and which delivers the control signal to said output circuit;

a voltage detector for detecting the voltage applied to the welding output terminals;

said welder showing a welding output characteristic having a constant current control arc characteristic in accordance with the reference signal and exhibiting a drooping characteristic in the vicinity of the arcing voltage and a further constant current control arc characteristic with an increasing current when the arc voltage is lowered; and an adjustment circuit for determining the magnitude of the reference signal to be delivered to the error detector in accordance with the output of said voltage detector, thereby to change the reference signal to allow an inter-characteristic transfer point between the constant current control arc characteristic and the drooping characteristic to be adjustable wherein said adjustment circuit changes the reference signal to allow the inter-characteristic transfer voltage from the constant current control arc characteristic corresponding to arc current to the drooping characteristic to be adjustable, and changes the reference signal to allow inter-characteristic transfer current from the drooping characteristic to the constant current control arc characteristic corresponding to short-circuit current to be adjustable.

* * * * *